United States Patent [19]

Palmeri

[11] 4,385,465
[45] May 31, 1983

[54] THROW-AWAY MOUSETRAP

[75] Inventor: Joseph J. Palmeri, Des Plaines, Ill.

[73] Assignee: Custom Tapes Inc., Harwood Heights, Ill.

[21] Appl. No.: 264,005

[22] Filed: May 15, 1981

[51] Int. Cl.³ .......................................... A01M 23/00
[52] U.S. Cl. ............................................ 43/58; 43/114
[58] Field of Search ...................................... 43/58, 114

[56] References Cited

U.S. PATENT DOCUMENTS

| | | | |
|---|---|---|---|
| 3,398,478 | 6/1966 | Pearsall | 43/58 |
| 3,816,956 | 6/1974 | Sekula | 43/114 |
| 4,161,079 | 7/1979 | Hill | 43/58 |
| 4,208,828 | 6/1980 | Hall | 43/114 |
| 4,244,134 | 1/1981 | Otterson | 43/58 |

Primary Examiner—Nicholas P. Godici
Assistant Examiner—Richard K. Seidel
Attorney, Agent, or Firm—Michael G. Berkman

[57] ABSTRACT

A throw-away mousetrap consisting of a blank of semi-rigid sheet stock which is prescored for simple conversion into a tubular housing. The floor surface of the housing is coated with a highly adhesive composition which serves as a permanent physical securement and entrapment medium when a mouse enters the housing. The trap is preferably sprayed with a scent to serve as an attractant to the mouse. After serving its purpose the mousetrap is easily closed, and then discarded-mouse and all.

6 Claims, 6 Drawing Figures

U.S. Patent May 31, 1983 4,385,465
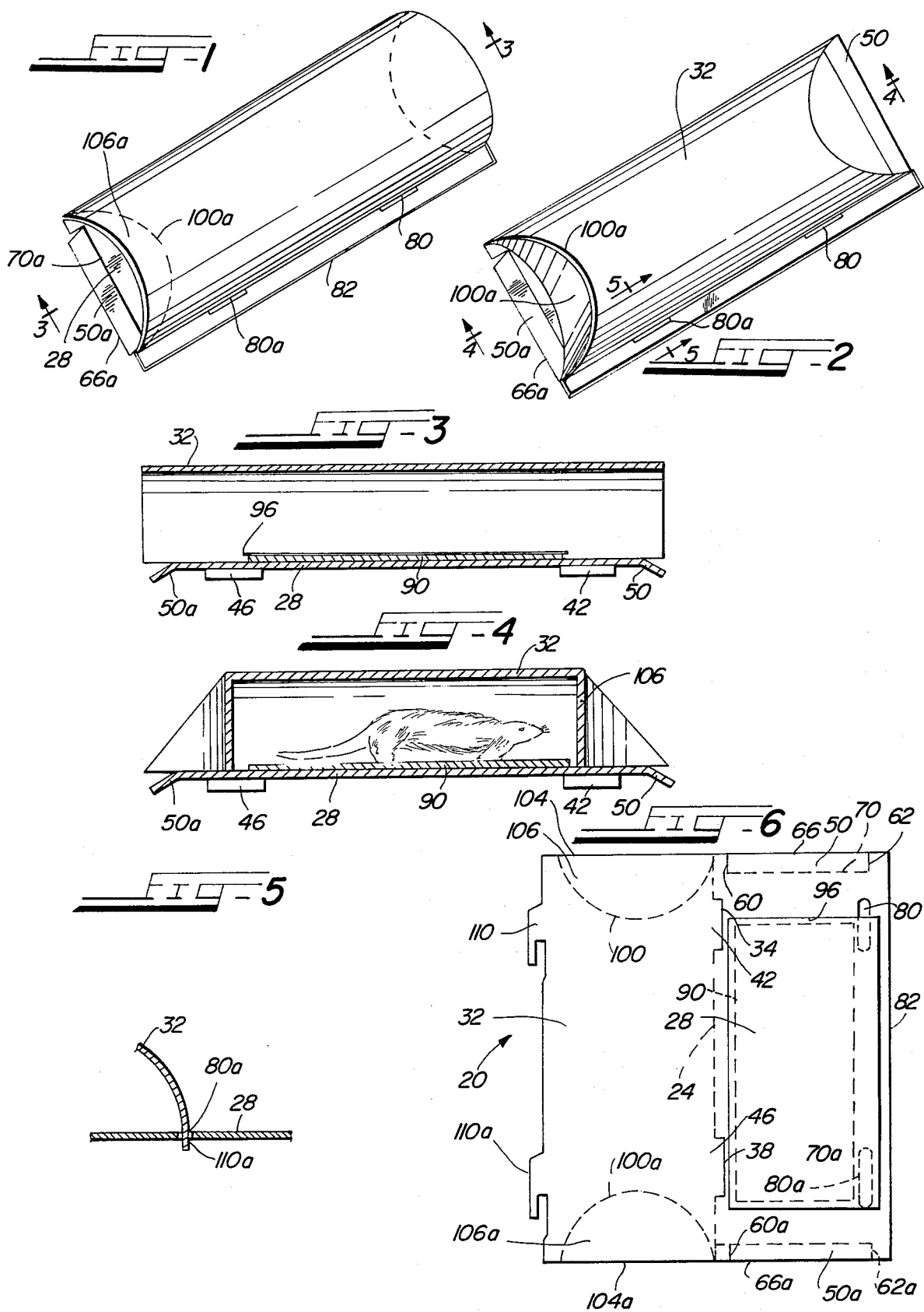

THROW-AWAY MOUSETRAP

BACKGROUND OF THE INVENTION

The present invention relates to a better mousetrap. More particularly, the invention is directed to a unitary, throw-away mousetrap of the single-use type.

Heretofore, it has been the common practice to employ reusable mousetraps of the type which require the user to discard a first rodent and to retrieve the trap for subsequent and repeated reuse. While it may appear that such procedures would have inherent economies, there are clearly objectionable features in this kind of device. The subject improved mousetrap not only obviates the need to deal with the trap itself once the mouse has been caught, but is so fashioned that there is no need at any time physically to view the rodent in its final position.

The trapped mouse and the single-use mousetrap of the invention may be discarded without one's ever even viewing the mouse. These features of the improved mousetrap of the invention have very obvious advantages which need not be related in detail.

It is a principal feature of the present invention that there is provided an improved mousetrap of the type which is discardable after a single use.

A related feature of the invention is that the mousetrap is fabricated of relatively inexpensive materials so that the discarding of the trap after only a single use is practically feasible.

An inherent structural feature of the invention is that the mousetrap is fabricated of cardboard or similar materials and may be shipped in a space-conserving flat configuration.

Yet another advantage of the present invention is that it is conveniently fabricated from a single, flat planar sheet of cardboard or similar material. In a preferred embodiment of the invention a scent-producing agent is incorporated in or on the structural board of the trap to serve as a mouse attractant.

It is a structural feature of the mousetrap of the invention that it is readily erected from a planar blank to form a housing including a floor and a surmounting roof.

A related structural feature of the mousetrap is that the housing includes integrally formed front and rear endwalls or closures which may be positioned in place after use of the trap to obviate viewing of the contained rodent.

Another feature of the mousetrap is that it may be readily and quickly assembled for use without any tools and without any special mechanical aptitude or expertise.

Yet another feature of the improved mousetrap of the invention is that it includes as an inherent component a scent producing agent for attracting the mice.

A related feature of the invention is that it may be used both with and without the incorporation of additional baits such as bacon or cheese, etc.

Yet another practical advantage of the mousetrap of the invention is that it may be placed in any desired location without any concern of possible injury to furniture or furnishings, food cabinets, clothing, etc.

It is an important practical advantage of the mousetrap of the invention that it constitutes a completely "hands-off" device and method, it being necessary at no time that the mouse be either viewed or manipulated in any way.

other and further objects, features, and advantages of the invention will become evident upon a reading of the following specification taken in conjunction with the drawings.

BRIEF DESCRIPTION OF THE DRAWINGS

FIG. 1 is a perspective view of the assembled mousetrap of the invention as seen from above;

FIG. 2 is a view similar to FIG. 1 but with the opposed end walls pivotally lowered in place after bending along preformed fold lines, to provide an essentially closed container;

FIG. 3 is a cross-sectional view taken substantially on the lines 3—3 of FIG. 1;

FIG. 4 is a cross-sectional view taken substantially on the lines 4—4 of FIG. 2 and indicating schematically the inclusion of a trapped mouse in the mousetrap of the invention;

FIG. 5 is a sectional view taken substantially on the lines 5—5 of FIG. 4 and showing the manner in which the vaulted roof is keyed into the base of the structure; and FIG. 6 is a plat depicting the physical configuration blank from which the mousetrap of the invention is fabricated.

DESCRIPTION OF THE PREFERRED EMBODIMENT

The aims and objects of the invention are accomplished by utilization of a single preformed and precut and scored blank of cardboard or similar sheet material, in conjunction with a coated layer of a highly adhesive material protected by a peelable cover sheet. The unitary blank includes not only all of the components necessary to shape and form and ultimately to close the container which constitutes the invention, but also integrally formed means by which the structure is assembled in an erected and stabilized form. The only step necessary as preliminary to erection of the mousetrap of the invention for use is to peel the protective cover sheet from the adhesive layer so that the layer will be fully exposed interiorly on the floor of the structure when it is completed and fully assembled.

Referring now to the drawings, and more particularly to FIG. 6, there is shown one preferred of the embodiment of the blank 20 of the invention provided for illustrative purposes and not to be construed in any limiting sense. The blank 20 is generally rectangular in form and is divided lengthwise along a fold line 24 into two portions, a floor panel 28 and a roof panel 32. The fold line 24 is interrupted at linearly separated positions by a pair of generally U-shaped slits 34 and 38 whose arms extend inwardly into the floor panel 28 and terminate at the fold line 24. The slits 34 and 38 define tabs 42 and 46 which, in the ultimate erected mousetrap constitute two of the support legs of the assembly, as will be more fully explained hereinafter.

The floor panel 28 is provided, at each of its opposed ends, with a flap 50 and 50(a), each flap being delineated by a pair of spaced cuts 60 and 62 and 60(a) and 62(a) extending inwardly from opposed end limits 66 and 66(a) of the floor panel 28. At their inward limits, the pairs of cuts 60–62 and the cuts 60(a) and 62(a) are connected by fold lines 70 and 70(a) generally parellelling the respective ends 66 and 66(a) of the floor panel 28. In the final erected structure the panels 50 and 50(a) constitute ramps at each of opposed ends of the mousetrap.

The floor panel 28 is provided at a marginal zone opposed to the tabs 42 and 46 with a pair of elongated slots 80 and 80(a) adjacent and generally parallel to the free lateral edge 82 of the floor panel 28. The slots 80 and 80(a) serve functionally as part of the interlocking means for obtaining the final erected structure in stable configuration, as will become evident hereinafter.

The major portion of the floor panel 28 is coated with a highly adhesive composition 90 (FIGS. 3 and 4) which constitutes the means by which the trap-entering mousing is held in securement. This type of adhesive is available commercially from any of several sources. The adhesive layer 90 is covered with a removable or peelable protective cover sheet 96 (FIG. 3) which is removed just prior to the final assembly or erection of the mousetrap.

Referring further to the roof panel 32, and particularly to FIG. 6, panel 32 is formed at each of its opposed ends with an arcuate fold line 100, 100(a) the arc terminating at each of its ends at the respective edges 104 and 104(a) of the roof panel 32 so that each fold line 100 and 100(a) demarks an end wall 106 and 106(a) positionable so as to close each of the opposed ends of the mousetrap's structure, as desired, after a mouse has been caught.

At its free lateral edge, the roof panel is formed with a pair of spaced key-like tabs 110 and 110(a) for insertion into and locking engagement within the corresponding slots 80 and 80(a) when the roof panel 32 is folded along the fold line 24 to overlie the floor panel 28 so as to establish the housing depicted in FIG. 1.

It will be appreciated upon consideration of the above set forth description, in conjunction with the illustrative drawings, the manner in which the subject mousetrap is simply and readily erected, and the manner in which the structure operates for its intended function.

The mousetrap of the invention is conveniently erected for use following a few simple steps. First, the protective cover sheet 96 is peeled to expose the adhesive layer 90 on the floor panel 28. The roof panel 32 is folded on the line 24 so that the panel overlies the floor panel 28 and the tabs 110 and 110(a) are inserted respectively in cooperating slots 80 and 80(a) to provide the vaulted housing illustrated in FIG. 1. The projecting portions of the tabs 110 and 110(a) become two of the four feet on which the assembly stands. The other two feet are the tabs 42 and 46 defined by the slits 34 and 38, as previously described.

With the housing erected, it is necessary merely to deflect the opposed flap-like ramps 50 and 50(a) so that they rest on the substrate on which the mousetrap is positioned.

What is claimed is:

1. A mousetrap readily erectable from an essentially flat, space-conserving planar blank into a housing configuration including a floor surmounted by an overlying roof, and integral end walls, said mousetrap comprising baseboard means of semi-rigid sheet stock,
   an adhesive composition coating said baseboard means at a laterally offset areal zone thereof,
   a fold-line formed in and extending across said baseboard means and dividing said baseboard means into adjacent panels comprising floor panel means coated with said adhesive composition and roof panel means pivotal at said fold line to overlie said floor panel means with a free marginal edge of said roof panel means generally paralleling and co-extensive with a corresponding free marginal edge of said floor panel means,
   said floor panel means and said roof panel means provided with cooperating inter-coupling means at adjacent respective facing marginal edge portions thereof to facilitate attachment of a free marginal edge portion of said roof panel means to a corresponding marginal edge portion of said floor panel means to form a tubular housing,
   said roof panel means having a greater lateral dimension than said floor panel means, thereby to establish a vaulted contour in said roof panel means upon attachment of said free marginal edge thereof to said corresponding marginal edge of said floor panel means, and
   end wall means consisting of an end portion of said roof panel means integrally formed therewith to depend from said roof panel means along an arcuate fold line extending inwardly from opposed lateral edges of said roof panel means,
   said end wall means defining a curved wall projecting inwardly into said tubular housing for closing said housing at an end thereof.

2. The structure as set forth in claim 1 and further comprising a peelable protective cover sheet applied over said adhesive composition and precluding premature and inadvertent adhesive contact therewith.

3. The structure as set forth in claim 1 wherein said intercoupling means for attachment of said free marginal edge of said roof panel means to said corresponding marginal edge of said floor panel means comprise cooperating slot means and tab means in opposed array at marginal zones of said roof panel means and said floor panel means for mating interlocking engagement therebetween.

4. The structure as set forth in claim 3 and further comprising leg means integrally formed with said baseboard means and projecting downwardly from said floor panel means to elevate said floor panel means in spaced relation from a supporting substrate, said leg means including end portions of said tab mean projecting through said slot means, and
   ramp means integrally formed with said floor panel means adjacent an end thereof, said ramp means being joined to said floor panel means along a fold line extending thereacross adjacent an end thereof and generally paralleling a peripheral end edge of said floor panel means, whereby said ramp is selectively pivotal downwardly along said fold line to present a free end edge thereof toward a supporting substrate therebeneath, and
   said ramp means being formed at each of opposed ends of said housing in said floor panel means thereof.

5. The structure as set forth in claim 4 wherein said leg means comprise integral wing-like projections of said roof panel means, said leg means being essentially coplanar with and projecting downwardly from said roof panel means at opposed side edges thereof.

6. The structure as set forth in claim 1 and further comprising an agent applied to to impart a scent to said mousetrap for attracting a mouse to enter said mousetrap.

* * * * *